United States Patent [19]
Blanc et al.

[11] 3,987,666
[45] Oct. 26, 1976

[54] DEVICE FOR REMOTE INSPECTION AND TESTING OF A STRUCTURE

[75] Inventors: Bernard Blanc, Gif-sur-Yvette; Jean Boudou, Meudon-la-Foret; Alain Castaing, Chevreuse; Jean Clasquin, Antony; Bernard Gallet, Bruyeres le Chatel; Robert Saglio, Massy; Alain Samoel, Gif-sur-Yvette, all of France

[73] Assignee: Commissariat a l'Energie Atomique, Paris, France

[22] Filed: Mar. 24, 1975

[21] Appl. No.: 561,064

[30] Foreign Application Priority Data
Apr. 10, 1974 France .............................. 74.12622

[52] U.S. Cl. ............................ 73/67.8 S; 176/19 R; 180/6.48
[51] Int. Cl.² ........................................ G01N 29/04
[58] Field of Search ........ 73/67.8 S, 67.8 R, 67.5 R, 73/71.5 US; 176/19 R; 324/37 R; 305/39; 280/28.5; 180/6.48, 6.5

[56] References Cited
UNITED STATES PATENTS

| 2,832,426 | 4/1958 | Seargeant ............................ 180/6.5 |
|---|---|---|
| 3,145,636 | 8/1964 | Hall et al. ............................ 176/19 R |
| 3,273,054 | 9/1966 | Cook .................................... 324/37 |
| 3,780,571 | 12/1973 | Wiesener ............................ 73/67.8 S |
| 3,800,535 | 4/1974 | Ward et al. ........................ 180/6.48 |
| 3,844,165 | 10/1974 | Savoy ................................ 73/67.8 S |

*Primary Examiner*—Richard C. Queisser
*Assistant Examiner*—Stephen A. Kreitman
*Attorney, Agent, or Firm*—Cameron, Kerkam, Sutton, Stowell & Stowell

[57] ABSTRACT

A self-propelled carriage for inspecting the primary vessel of a fast reactor is capable of displacement within the interspace between the primary vessel and the containment vessel in order to inspect and test any predetermined zone of the primary vessel, the carriage being associated with a drive mechanism and applied against the oppositely-facing wall of the containment vessel. The carriage is suspended from a composite cable actuated by a handling apparatus for introducing the carriage into the interspace and withdrawing it therefrom. The composite cable supplies electric power as well as the different fluids required for positioning and operation of the inspection devices which are mounted on the carriage.

9 Claims, 6 Drawing Figures

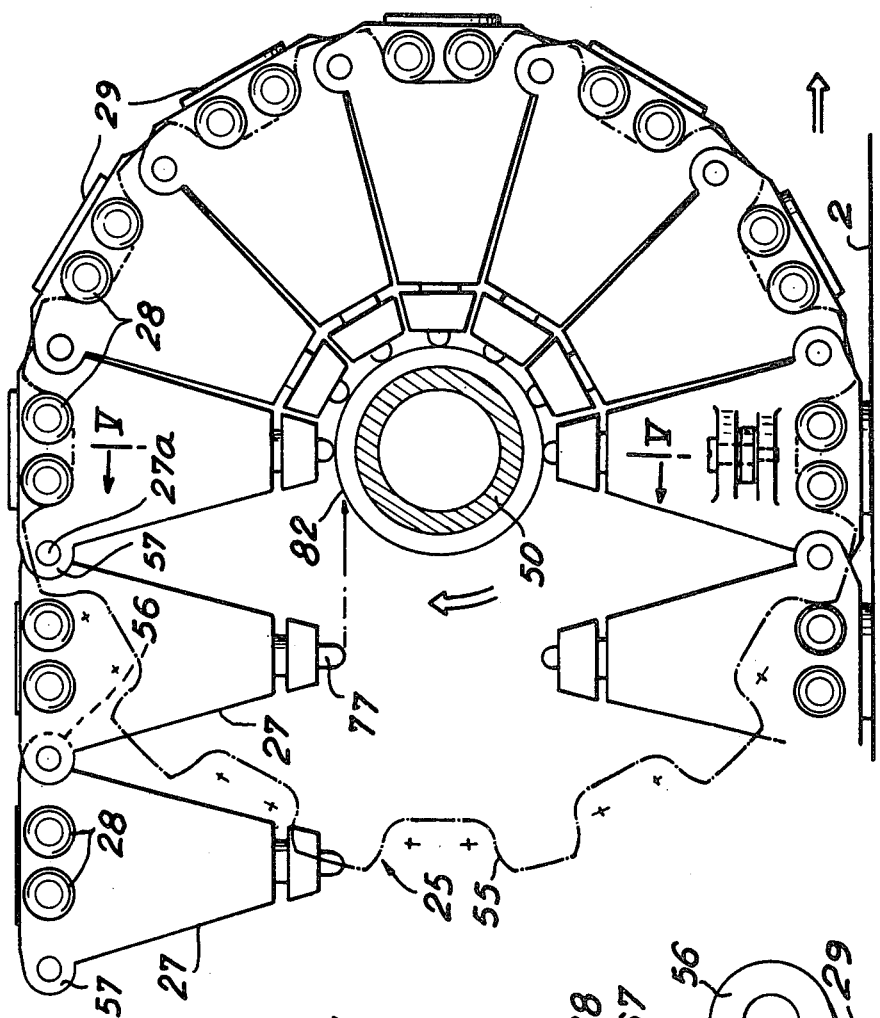
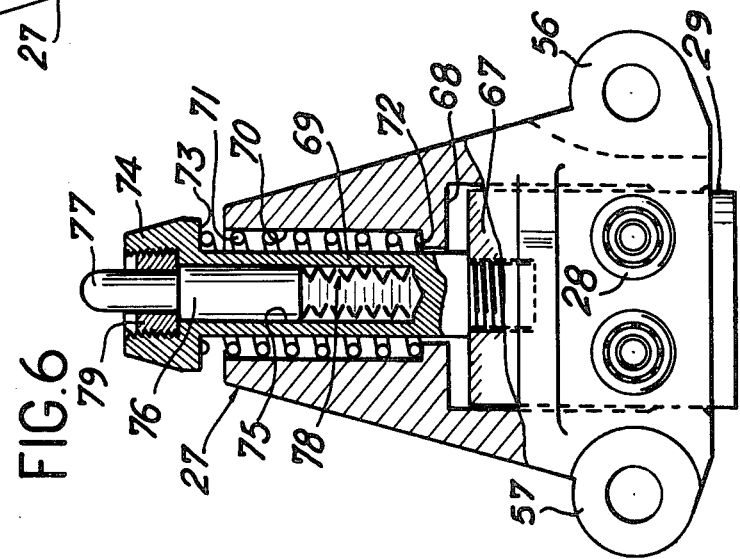

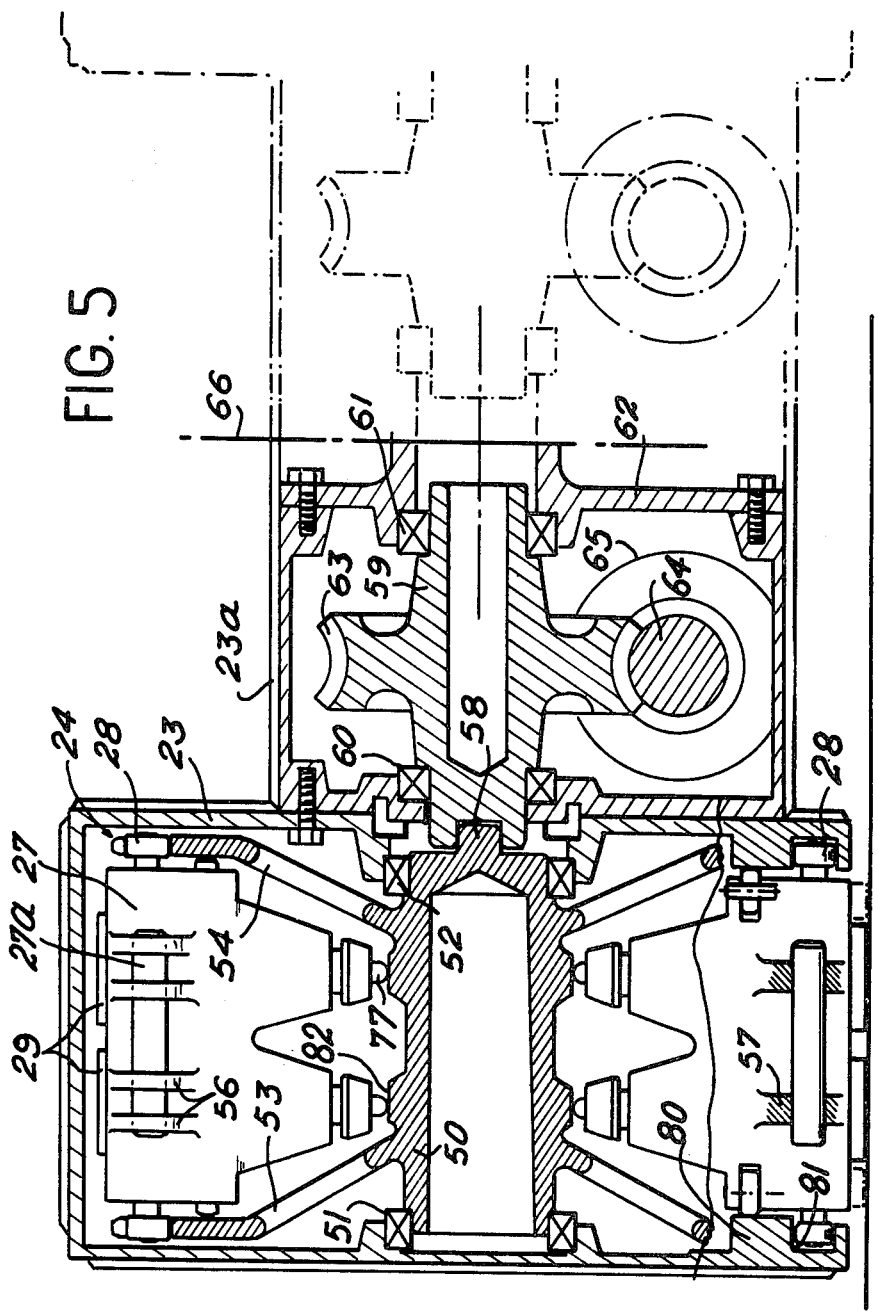

DEVICE FOR REMOTE INSPECTION AND TESTING OF A STRUCTURE

This invention relates to a device for remote testing and inspection of a structure in which the environmental conditions are such as to prohibit direct access by an operator and is of particular interest in nuclear reactors, especially fast reactors. The invention is more especially applicable to on-load inspection of the external surface of a primary vessel which contains the reactor core as well as a volume of continuously circulating metal for the extraction of heat generated by nuclear fission within the core.

The chief aim of the invention is to permit detection of flaws which are liable to appear in the reactor vessel, in particular in zones of welded joints between metal components of the vessel, this being achieved by making use of a remote-controlled equipment unit which carries suitable testing and measuring devices. It is thus possible to follow the development of flaws or other minor mechanical incidents which are liable to arise during the service life of the reactor with a view to adopting the necessary safety measures for preventing more serious accident conditions which might result in shutdown of the reactor over a long period of time.

It is known that, in a fast reactor, the primary vessel is usually designed in the form of a cylindrical shell having a vertical axis, the lower portion of which is closed by a hemispherical end and which is constructed of stainless steel with a view mainly to guarding against the corrosive action of the liquid metal contained therein and usually consisting of sodium. Said primary vessel is surrounded externally by a second vessel having a wall parallel to the first and known as a containment vessel. The open upper ends of the two vessels are suspended from a horizontal shield of substantial thickness which is constructed of steel or steel-lined concrete and forms a top closure slab or roof for a concrete reactor vault which protects the surrounding atmosphere from radioactive radiations. The outer containment vessel is constructed of low-alloy steel and defines with the primary vessel a narrow space which surrounds the entire external surface of the primary vessel. This space, known as an interspace and filled with a neutral gas usually consisting of nitrogen, is continually subjected to a temperature gradient between on the one hand the primary vessel in which the temperature varies from 400° to 250° C between normal reactor operation and shutdown and, on the other hand, the containment vessel in which the lowest temperature varies under the same conditions between 300° and 180° C, by virtue of the presence of an ancillary cooling circuit placed between said vessel and the wall of the concrete reactor vault. Said interspace usually has limited dimensions of the order of 700 mm at a maximum and is also subjected to the action of radioactive radiations derived from the reactor core. The effect produced by all the foregoing conditions is to prohibit direct inspection of the external wall of the primary vessel by an operator and to entail the need for a remote-controlled device.

This invention is precisely concerned with a remote inspection device distinguished by the fact that it comprises a self-propelled carriage which is designed to carry devices for inspecting the primary vessel and which is capable of moving within the interspace between the primary vessel and the containment vessel in order to inspect and test any predetermined zone of the primary vessel, said carriage associated with a drive mechanism proper being adapted to cooperate with the oppositely-facing wall of the containment vessel by being applied against said wall while being suspended from the extremity of a composite cable which serves to supply the carriage with power and with the different fluids required for positioning and operation of the inspection devices while serving at the same time to introduce the carriage into the interspace and to withdraw it therefrom by means of a handling apparatus which actuates the composite cable.

In accordance with a particular feature of the device under consideration, the self-propelled carriage comprises a supporting chassis for two parallel driving caterpillar tracks which are guided within the chassis and driven at an adjustable speed by means of two sprocket-wheels located respectively at the front and at the rear with respect to the direction of displacement of the carriage, each sprocket-wheel being driven in rotation by a motor independently of the other sprocket-wheel about an axis located transversely with respect to the chassis, each caterpillar track being constituted by the articulation of a plurality of identical elements in juxtaposed relation provided with lateral rollers engageable with the sprocket-wheel teeth, and means for temporary attachment to the surface of the containment vessel for maintaining the carriage applied against said vessel without limiting its relative displacement in front of the primary vessel.

In a preferred embodiment in which the containment vessel is constructed of magnetic material, each caterpillar-track element comprises a frame having a cavity in which is movably mounted a plunger-piston for attachment to the surface of the containment vessel in a direction at right angles to the axis of rotation of the sprocket-wheels, said piston being fitted with a terminal permanent magnet which is capable of being applied against the surface of the containment vessel. As an advantageous feature, the plunger-piston is slidably mounted within a bore of the frame and has a head-piece forming a stop for a spring applied against said head-piece and against an annular seating of the frame, said spring being intended to apply on the piston a force which is combined with the force of attraction of the magnet by the containment vessel wall and permits the release of the magnet which is driven by the rear sprocket-wheel during the winding-on displacement of the caterpillar track.

In accordance with another characteristic feature, the plunger-piston is itself provided with an axial blind-end bore in which a stud is slidably mounted in opposition to a stack of washers applied against the bottom of said bore, said stud being capable of cooperating with a cylindrical guide boss which is coaxial with the axis of the front sprocket-wheel. Said cylindrical guide boss forms a cam for exerting on the stud a force which causes the compression of the washers and the initial displacement of the plunger-piston so that the magnet carried by said piston projects from the element, thus facilitating the attraction of the piston by the containment vessel wall.

In accordance with yet another characteristic feature, the chassis of the self-propelled carriage comprises a double deformable parallelogram provided on each side of the axis of displacement of the carriage with two parallel link-arms pivoted at one end about two pins carried by the chassis, said two link-arms being in turn pivoted at their opposite ends on a supporting member for an orientable television camera and an ultrasonic testing apparatus which is capable of being applied against the external wall of the primary vessel. As an advantageous feature, the opening movement of the deformable parallelogram is carried out by means of a system of pneumatic jacks pivotally mounted on the one hand on the chasis and on the other hand on the articulation link-arms. The uktrasonic testing apparatus is preferably capable of undergoing a relative transverse movement of displacement in front of the primary vessel wall with respect to the supporting member.

The chassis of the self-propelled carriage is additionally provided with safety jacks, the bodies of which are placed at right angles to the containment vessel wall. As a result of the reaction of support on said wall, the operating rods of said jacks serve to detach the carriage within the interspace in order to permit withdrawal of this latter by applying a tractive effort on the composite suspension cable.

Said composite cable is advantageously controlled by a variable-tension winding and unwinding winch supported by a motor-driven trolley which is placed outside the interspace between the two vessels above the reactor vault roof so as to bring the cable and the self-propelled carriage opposite to openings formed in said vault roof.

In order to carry out an inspection of the entire wall area of the primary vessel by means of the testing devices carried by the self-propelled carriage and in particular in order to test welded joints formed between the different elements constituting said wall, the device in accordance with the invention finally comprises a system for guiding the self-propelled carriage. Said system is constituted by a series of magnetic strips projected onto the non-magnetic wall of the primary vessel in a direction parallel to the weld seams and by a magnetic detector, a signal delivered by said detector being intended to produce action on the motors which drive the caterpillar tracks of the carriage in order to control the displacement of said carriage.

Further properties of a testing device constructed in accordance with the invention will become apparent from the following description of one embodiment which is given by way of example without any limitation being implied, reference being made to the accompanying drawings, wherein:

FIG. 4 is a partial view to a larger scale showing the constructional detail of one of the caterpillar tracks for the displacement of the carriage which is illustrated in FIGS. 3 and 4;

FIG. 5 is a partial cross-sectional view taken along line V—V of FIG. 4;

FIG. 6. is a part-sectional view in elevation showing one element of the caterpillar track which is illustrated in FIG. 4.

Figure 1:
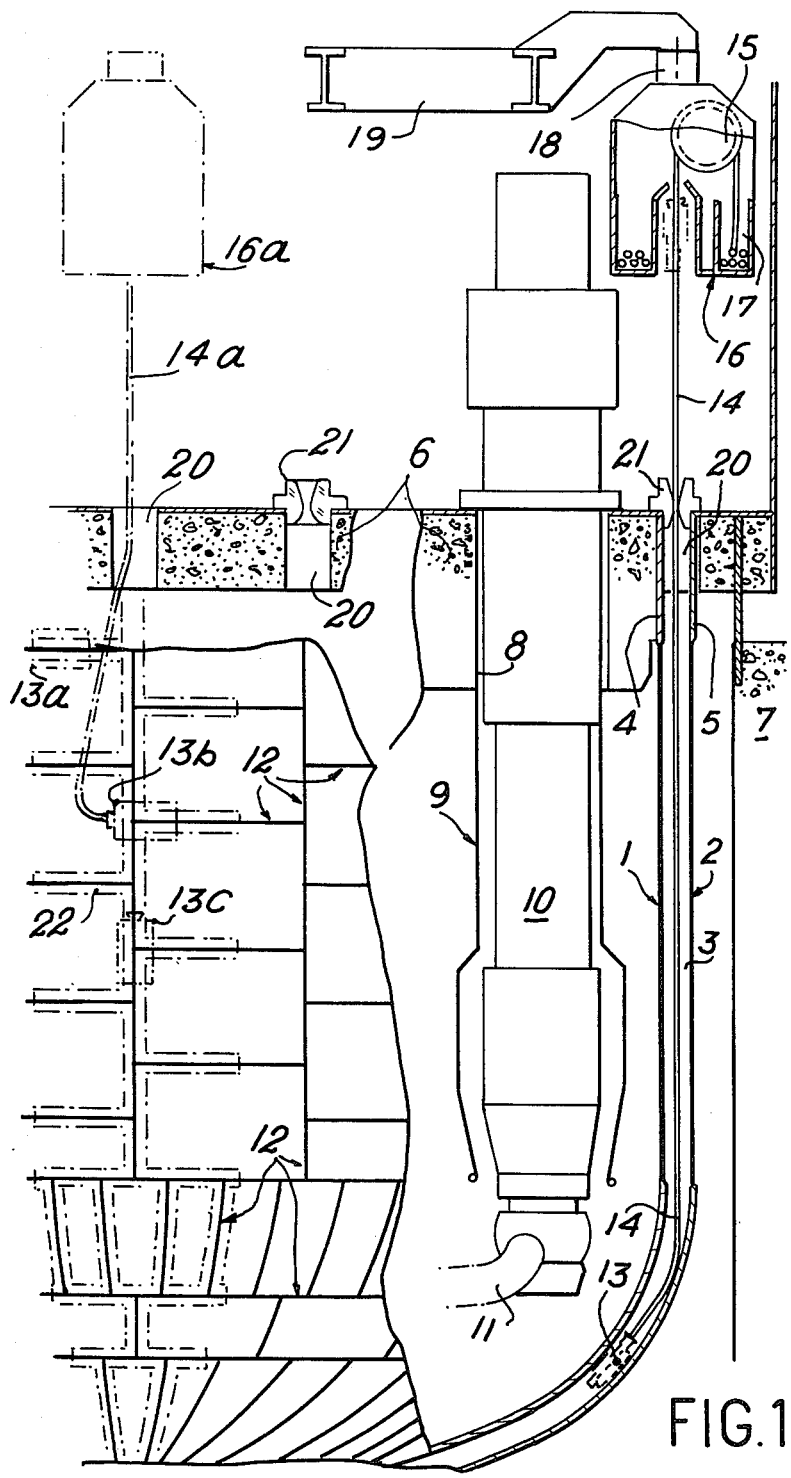
FIG. 1 is a diagrammatic longitudinal part-sectional view of a fast reactor which shows in particular the shape of the primary vessel and of the containment vessel, there being formed between said vessels an intermediate space or so-called interspace for the displacement of a remote-controlled test carriage for carrying out the inspection of the external surface of said primary vessel.

In the general part-sectional view of FIG. 1, there is shown a portion of the primary vessel 1 of a fast reactor of a type known per se, said primary vessel being intended in particular to contain the reactor core and a suitable volume of a liquid metal usually consisting of sodium which performs the function of coolant and is circulated through the reactor core in order to extract the heat produced by the fission reaction. The primary vessel 1 is usually constructed of stainless steel in order to afford resistance to corrosion by the sodium contained therein and has a generally cylindrical shape with a vertical axis. Said primary vessel is open at the top end, has a hemispherical bottom end and is surrounded externally by a second vessel 2 or so-called containment vessel which is coaxial with the primary vessel and the walls of which are parallel to this latter. The vessel 2 is consequently not in contact with the liquid metal coolant of the reactor core and can be constructed of material which is less costly than the primary vessel, especially of low-alloy steel. The two vessels 1 and 2 define between them an intermediate space or so-called interspace 3 which is filled with a neutral gas and especially nitrogen. Said interspace is of small width, namely of the order of 700 mm in the example under consideration, and extends around the entire periphery of the primary vessel. In accordance with the invention, the interspace is provided for the displacement of a self-propelled carriage 13 which serves to carry out inspection of the external wall of the primary vessel 1, especially during certain periods of the reactor life. The vessels 1 and 2 are provided at their upper extremities with suspension stakes 4 and 5 respectively for rigidly fixing said vessels to a horizontal slab 6 of substantial thickness and formed of steel-lined concrete. Said slab is located above the level of sodium within the primary vessel and forms a roof for closing-off the top portion of a concrete vault 7 having walls of considerable thickness which surround the vessels and protect the external environment against radioactive radiations. In accordance with one arrangement which is conventional in this type of reactor, the vault roof 6 is provided with different vertical through-holes such as the hole 8 in which are engaged guide sleeves 9 for the introduction of internal components or reactor equipment into the vessel 1 through the vault roof 6. One of these internal components which is shown in FIG. 1 and designated by the reference 10 constitutes a primary pump for the circulation of liquid sodium within the primary vessel 1; said liquid sodium can thus be continuously discharged through an outlet duct 11 and returned beneath the reactor core (not shown in the drawings) through which the sodium flows in the upward direction.

Taking into account the appreciable dimensions which can attain 20 meters in diameter and 12 to 15 meters in height in the case of a high-power fast reactor of the order of 1000 MW (electrical), both the primary vessel 1 and the containment vessel 2 are constructed by initial welding of a series of elements, especially steel plates suitably dimensioned and formed by means of weld beads or seams such as those designated by the reference 12, said seams being advantageously distributed along parallel lines and meridian lines of said vessels. It is apparent, however, that provision must be made for the remote inspection of these vessels and especially the primary vessel 1 after these latter have been placed in position within the reactor vault 7. This inspection operation is carried out in particular by means of the self-propelled carriage 13 as shown diagrammatically in this figure. This carriage is capable of moving within the interspace 3 which, apart from any other consideration, would not permit direct inspection by an operator by reason of its relatively small dimensions. Moreover, it is necessary to take into account the radioactivity which is present within the interspace 3 and prohibits any direct human intervention. Finally, it is important to take into consideration the relatively high temperature gradient which exists within the interspace 3 since the primary vessel 1 is always at a higher temperature than the containment vessel 2.

The remote-controlled self-propelled carriage 13 which is capable of adapting itself to these environment conditions is mounted so as to be suspended from the extremity of a composite cable 14 which serves to supply the carriage with electric power as well as the different fluids which are necessary for the operation of the inspection and testing appliances or components supported by said carriage. The cable 14 is connected outside the reactor vault roof 6 to a winding and unwinding winch 15 for applying adjustable tension to said cable, especially a tension which is proportional to the length wound-off. Said winch 15 is mounted within the interior of a container 16 which comprises a compartment 17 for storing the cable in a remote position of the interspace 3. Said container 16 is in turn suspended from a trolley 18 and this latter is capable of moving along a circular track 19 which surmounts the reactor above the vault roof 6.

In order to permit the introduction of the carriage 13 which is suspended from the extremity of its cable 14 into the interspace 3, the reactor vault roof 6 is provided with a series of through-holes such as the hole 20 which are twelve in number in the example under consideration and partially closed by guides 21 which serve to control the unwinding of the cable once the carriage 13 has been introduced into the interspace 3 and also serve to limit outleakage of the neutral gas atmosphere from said interspace 3. In FIG. 1, the container 16 is shown in two different positions on its track 19, one position being illustrated in full lines and the second position being shown in chain-dotted lines, the container being designated by the reference 16a in this second case. It is apparent from this figure that, in said second position, the carriage which is suspended from the extremity of the cable 14a can be oriented in several directions designated by the reference 13a, 13b or 13c. Each direction corresponds to a suitable orientation of the carriage with respect to a weld seam 12 to be inspected, the zones swept by the carriage as this latter passes along said seams being represented diagrammatically in the drawing by the references 22. More detailed explanations concerning the operation of the device will naturally be given hereinafter.

Figure 2:
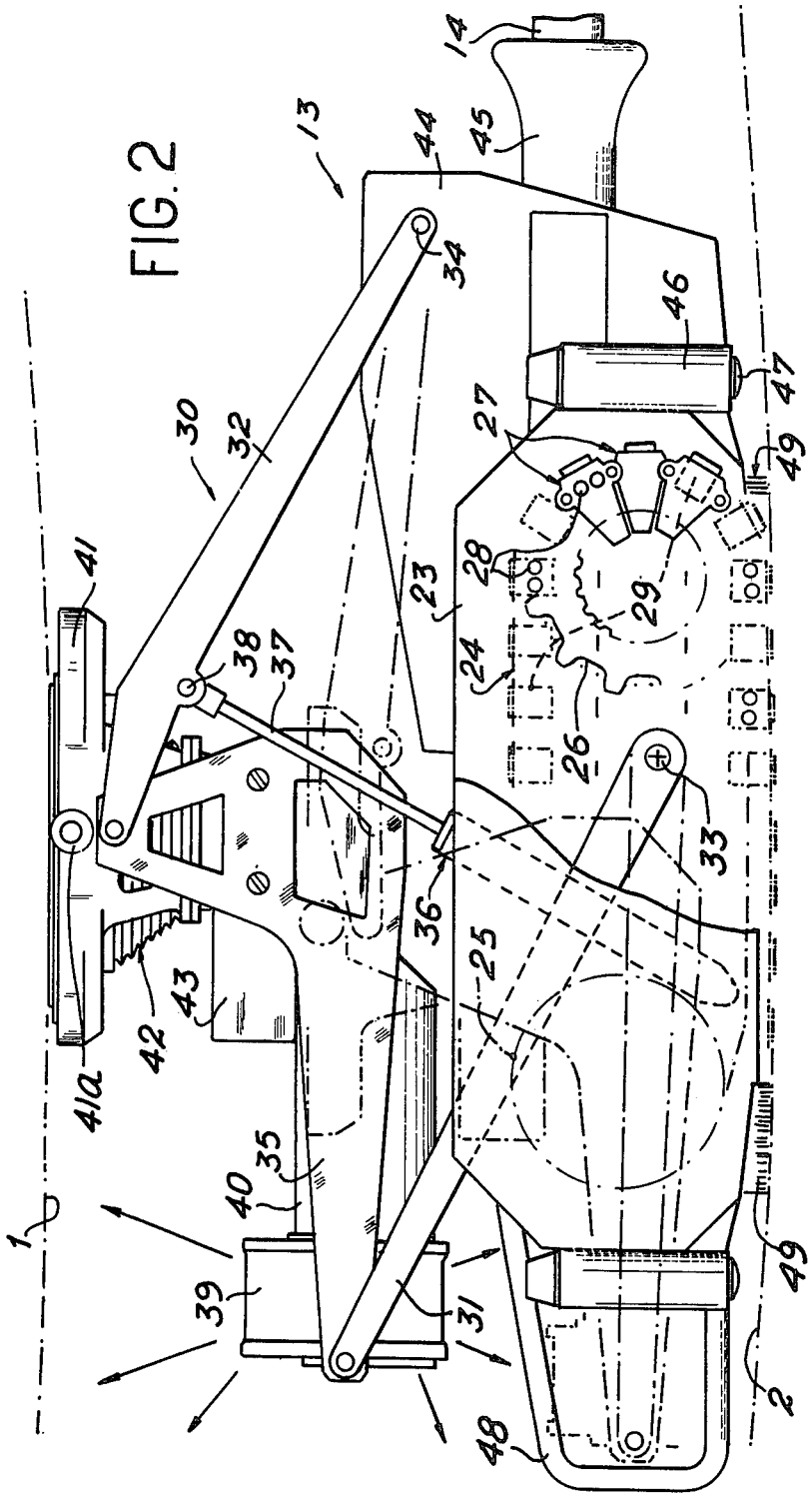
FIG. 2 is a view in elevation to a larger scale showing the remote-controlled carriage, and especially the testing and inspection elements supported by said carriage.
Figure 3:
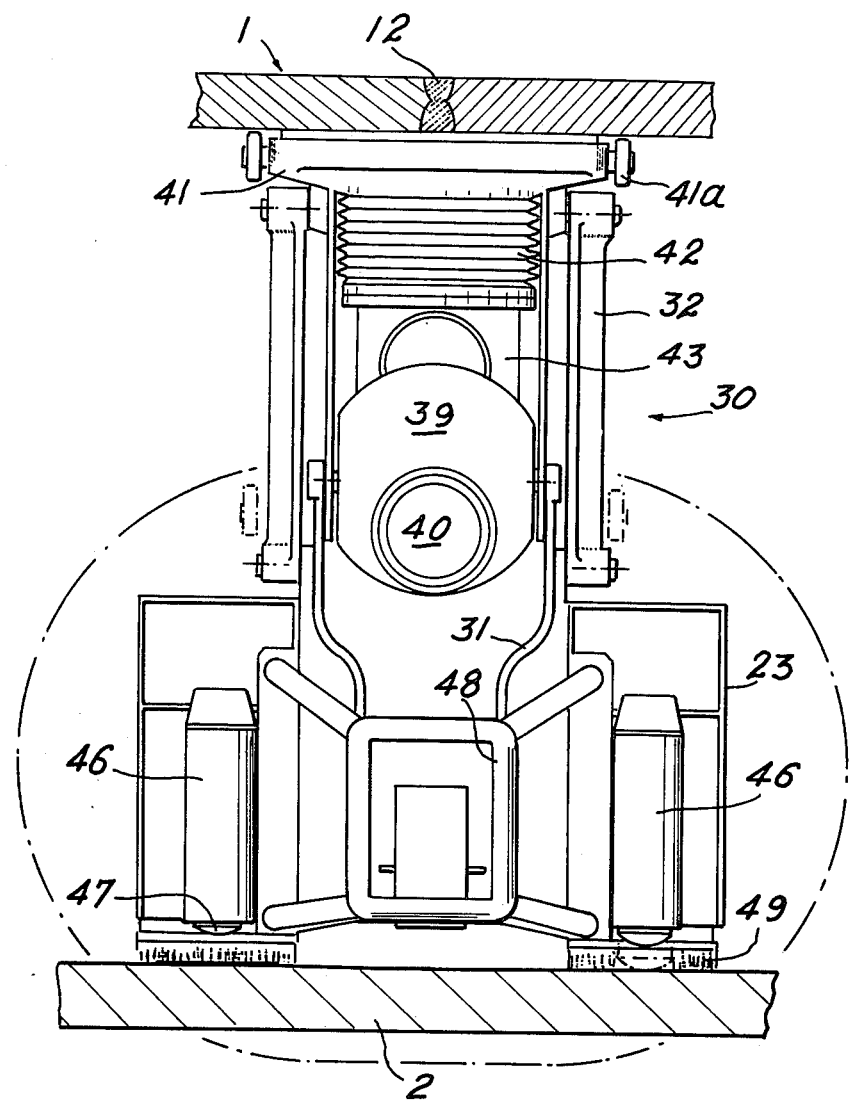
FIG. 3 is a side view of the carriage illustrated in FIG. 2.

The construction of the self-propelled carriage 13 is illustrated to a larger scale in FIG. 2. It is seen from this figure that said carriage mainly comprises a chassis 23 which supports two parallel caterpillar tracks, only one of which appears in the plane of the figure and is designated by the reference 24. In order to determine the displacement of the carriage 13 within the interspace 3 between the vessels 1 and 2, each caterpillar track is driven independently of the other with respect to the chassis 23 by means of two sprocket-wheels 25 and 26 respectively, or in other words a front sprocket-wheel and rear sprocket-wheel with respect to the direction of displacement. To this end, the caterpillar track 24 for example comprises a series of articulated elements 27 which will be described in detail hereinafter and are fitted with rollers 28 which are capable of engaging with the teeth of the sprocket-wheels 25 and 26 in order to produce the relative displacement of the caterpillar track and the movement of the carriage. Changes of direction of the carriage are obtained by modifying the speed or even the direction of rotation of one track with respect to the other in accordance with a procedure which is wholly conventional in this type of equipment unit. Each element 27 which will be described in detail with reference to FIGS. 4 and 6 in particular supports a mechanism which makes it possible by means of its chassis to apply the carriage 13 against the wall of the containment vessel 2 opposite to the wall of the primary vessel 1. In the example of construction which is more especially considered, this application mechanism is constituted by a set of two permanent magnets 29 which are provided for each caterpillar-track element. Said magnets produce magnetic attraction of the carriage by the wall of the containment vessel 2 which is formed of black steel whilst the stainless steel primary vessel 1 is on the contrary non-magnetic.

As mentioned earlier, the carriage 13 supports a number of appliances for inspecting and testing the wall of the primary vessel 1, especially at the level of the weld seams 12, progressively as the carriage advances. To this end, the chassis 23 supports a double deformable parallelogram 30 provided on each side of the chassis 23 with two link-arms 31 and 32 respectively which are pivotally attached at one end to the chassis at 33 and 34 and the opposite ends of said link-arms carry a supporting member 35 which is also pivotally attached to said link-arms. Pivotal motion of the deformable parallelograms with respect to the chassis 23 is preferably carried out by means of a pneumatic or hydraulic jack 36, the operating rod 37 of which is pivotally mounted at 38 on the link-arm 32, for example. The supporting member 35 is advantageously designed to carry an orientable camera 39 associated with a remote-control unit 40 of a type known per se which permits electrical supply, focusing and pointing of the camera on the primary vessel wall. The characteristics of the camera lens permit visual detection of a flaw of 0.5 mm with a focal length of 350 mm, the area of the image obtained being close to that of a rectangle in which the length of the diagonal is 100 mm. The member 35 also supports an ultrasonic testing apparatus 41 associated with bearing rollers 41a and with a bellows seal 42 which serves to maintain a suitable couplant liquid inside a closed cavity without any attendant danger of contamination or deposition on the metallic wall of the primary vessel. The ultrasonic apparatus 41 is connected to a control device 43 which also makes it possible to supply the apparatus and to carry out the relative displacement of this latter with respect to its initial position on the chassis 23 in order to sweep each weld seam 12 under inspection, on each side of the central zone of said seam.

The chassis 23 is extended towards the rear of the carriage with respect to the direction of displacement of this latter by a connecting-plate 44 terminating in an end-piece 45 for guiding and fastening the extremity of the suspension cable 14. The chassis supports a series of jacks 46 or trip-spring elements which are placed substantially at right angles to the wall of the vessel 2 in such a manner as to ensure that, as a result of a reaction of support on said wall, the operating rods 47 of said jacks are capable of detaching the carriage 13 if so required while ensuring under these conditions the free suspension of said carriage from the extremity of the cable 14, for example with a view to withdrawing the carriage from the interspace 3 by means of the winding drum 15 (as shown in FIG. 1) through one of the holes 20 of the reactor vault roof 6. The carriage 13 is also provided at the extremity remote from the cable 14 with a bumper device 48 which ensures protection of the camera 39 when this latter is applied against the chassis 23 in the folded-back position of the deformable parallelograms. Finally, wire brushes 49 are carried by the chassis 23 on each side of the displacement caterpillar tracks in order to clean the wall of the containment vessel 2 continuously in front of or behind the carriage. The main object thereby achieved is to prevent the attraction of dust particles and especially metal particles against the magnets 29 of the caterpillar track elements 27 as this would be liable to limit the attractive force of said magnets and the suitable application of the carriage against said wall.

FIGS. 4 and 5 illustrate to a larger scale, respectively in elevation and in cross-section, the constructional detail of the caterpillar tracks 24 and their drive mechanism. Each track comprises in particular in the case of each sprocket-wheel 25 or 26 a hollow shaft 50 which is rotatably mounted on bearings 51 and 52 within the interior of the frame 23. Said hollow shaft 50 is extended by lateral end-plates 53, 54 respectively (as shown in FIG. 5). The extremities of said end-plates have curved portions 55 (as shown in FIG. 4) which form driving teeth for the rollers 28 of the caterpillar track elements 27. Said elements are pivoted at successive points about cross-pins 27a and these latter are passed through lugs 56 and 57 respectively which are formed on two successive elements 27. By means of this arrangement, said elements are permitted to assume the orientation to which they are subjected during the displacement of the corresponding caterpillar track between the front and rear sprocket-wheels 25 and 26 as they pass round these latter. The hollow shaft 50 has a dog 58 which provides a coupling with the extremity of a drive pinion 59 which is in turn rotatably mounted on bearings 60 and 61 within a central casing 23a of the chassis 23. Provision is made on said pinion 59 for a toothed ring 63 having a helical set of teeth disposed in meshing engagement with a worm 64 which is driven by a reduction-gear motor 65. As shown in FIG. 5, an assembly which is symmetrical with respect to the mid-plane 66 of the chassis corresponds to the complete mechanism which is associated with one of the caterpillar tracks of said chassis. As mentioned earlier, the carriage comprises two independent but parallel caterpillar tracks, the driving motors being controlled independently of each other in order to permit the lateral pivotal movements of the carriage in a manner known per se by causing one of the caterpillar tracks to rotate at a higher speed than the other or by displacing the second track in a movement which is opposite to that of the first.

Referring now to FIG. 6, there is shown to an even larger scale the constructional detail of one of the elements 27 employed in the construction of the caterpillar tracks of the carriage 13. Each element comprises in particular a piston 67 mounted within a cylinder 68 formed inside the body or frame of said element. Said piston has an extension in the form of an axial rod 69 slidably mounted within a bore 70 having a diameter which is substantially larger than that of said rod in order to delimit with this latter an annular space in which is fitted a spring 71 having substantial flexibility or in other words having a low variation in force in respect of substantial elongation. Said spring is applied at one end against a seating 72 formed within the body of the element 27 and at the other end against an annular shoulder 73 of a head-piece 74 which forms an extension of the rod 69 at the end remote from the piston 67. The rod 69 is in turn provided with a blind-end bore 75 in which is engaged a stud 76 terminating in an actuating end-button 77 which serves to thrust-back the stud in opposition to a stack of resilient washers 78 which are housed within the bore 75 beneath said stud. A plug or bush 79 is screwed into the top portion of the head-piece 74 and thus serves as an upper end-stop for the stud 76.

The equipment of the carriage 13 is finally completed by forming in the lateral end-plates of the chassis 23 a guide member 80 for each lateral caterpillar track. There is formed in said guide member a groove 81 in which the rollers 28 of the elements 27 engage successively as they are displaced by the sprocket-wheels, especially when said elements together with their magnets 29 are moved close to the wall of the containment vessel 2, thus initiating the attraction of said magnets. In addition, the external surface of the hollow shaft 50 which drives each sprocket-wheel is provided with outwardly projecting annular guide bosses 82 forming actuating cams for the projecting end-buttons 77 of the studs 76 which are associated with each of the elements 27 of the two caterpillar tracks. As can be seen from the sectional view of FIG. 5, it will be noted that each element 27 comprises two adjacent magnets 29 each subjected to the action of a spring 71 and a stack of washers 78 as shown in FIG. 6. The overall result thereby achieved by this duplication of magnets in the case of each element is a better attraction of the carriage 13 by the metallic wall of the vessel 2 and consequently better fixation of the carriage against said wall during its displacements, in particular in the vertical portions of the wall which define the interspace 3.

The operation of the inspection and testing device under consideration can readily be deduced from the foregoing. It is in fact required to ensure that the state of the beads or seams 12 forming welded joints between the different stainless steel elements constituting the primary vessel can be continuously checked during reactor operation. This in turn permits the possibility of detecting all flaws which appear in such welds a⁻ᵈ especially of controlling the progressive development of such flaws in time. Any major fault condition which would be liable to cause irreparable damage to the reactor vessel can consequently be prevented by taking the necessary safety precautions in due time. It is thus a desirable objective to permit the possibility of inspection during each period of reactor shutdown. This is accordingly carried out by displacing the carriage 13 within the interspace 3 between the vessels 1 and 2, the environmental conditions of the nitrogen atmosphere which is present within said interspace being such that the thermal gradient existing between the vessels 1 and 2 can be tolerated by the carriage mechanisms and the testing appliances supported by this latter. It can be mentioned by way of indication that the temperature of the primary vessel 1 during a period of reactor shutdown is of the order of 250° C whilst the containment vessel 2 can be cooled between the external wall and the concrete shield structure 7 to a temperature of the order of only 120° C.

In order to carry out an inspection of the external face of the primary vessel wall as mentioned above, the carriage 13 which is suspended from the extremity of its cable 14 within the interspace 3 is first introduced through one of the holes 20 formed for this purpose in the reactor vault roof 6. To this end, the first step consists in removing the guide 21, then in bringing to the level of the through-hole which has thus been freed the container 16 together with its suspension cable and carriage 13 by displacing the trolley 18 along the circular track 19 which is located above the reactor vault roof 6, said trolley being then locked on said track. The carriage is then moved downwards through the hole 20, the winch 15 being operated so as to control both the twist of the cable and the tension of this latter which is maintained proportional to the length wound-off. Once the carriage 13 has been introduced into the interspace 3 beneath the vault roof 6, said carriage is then brought into contact with the magnetic wall of black steel of the containment vessel 2 in order to cause said carriage to be supported by said wall by means of the series of magnets 29 of the oppositely-facing elements 27 of the caterpillar tracks, thereby relieving the cable 14. At this moment, the carriage is entirely supported by the wall 2; the cable 14 is no longer subjected to any effort and is capable of following freely the controlled movements of said carriage both in the transverse direction and in the vertical direction.

In order to initiate the displacement of the carriage within the interspace 3, the motors 65 for driving the sprocket-wheels 25 are accordingly started-up so as to produce the displacement of the caterpillar tracks in the appropriate direction and in particular to displace the carriage in forward motion or else to produce changes of orientation by differential action on either of the two caterpillar tracks. The movement of rotation of the sprocket-wheels 25 and 26 in fact has the effect of bringing each caterpillar track element 27 successively opposite to the wall of the vessel 2 so that each element is in turn applied against the opposite surface and has the effect of supporting the carriage. During this movement and as shown in FIGS. 4 and 5, the rollers 28 are driven successively by the teeth 55 of said sprocket-wheels whilst the projecting end-buttons 77 of the studs 76 come into contact with the annular guide bosses 82 which form cams and are mounted on each hollow shaft 50. Said studs 76 are thus thrust into their bores 75 in opposition to the resilient washers 78 and apply on the piston 67 a force which causes the magnets 29 to move into a suitably projecting position with respect to the apparent contour of the corresponding caterpillar track. As the movement of rotation of the sprocket-wheels continues, so the successive elements 27 move sufficiently close to the wall of the containment vessel 2 to ensure that the magnetic attraction initiates the application of the magnets 29 against said wall together with a correlative compression of the springs 71. The displacement of the carriage thus takes place at successive points, the application of each succeeding element 27 of the caterpillar tracks against the containment vessel 2 by virtue of the forward motion of the front sprocket-wheel for example being concomitant with the disengagement of another element of the same track by the rear sprocket-wheel 26. It should be noted that the floating assembly of the permanent magnets 29 carried by each caterpillar track element 27 and the number of said magnets ensures in this case maximum efficiency of application of the carriage 13 against the wall of the containment vessel 2. In particular, this result is achieved irrespective of the concavity exhibited by said wall on the path of the carriage within the interspace 3.

As a general rule, the weld seams 12 formed on the external surface of the primary vessel wall are carefully ground at the time of fabrication and assembly of the vessel and preferably formed along parallel lines and meridian lines of said vessel. In order to follow said seams correctly, it is particularly useful to form magnetic guide strips or the like on the primary vessel wall. As a preliminary step, said guide strips are obtained in particular by projecting or spraying a suitable magnetic material which permits more effective positional control of the carriage. Since the elements constituting the primary vessel wall are formed of non-magnetic stainless steel, provision can accordingly be made for strips of an additional metal having a very small thickness within the range of 4 to 6/10 mm without thereby introducing any mechanical disadvantages in regard to the displacement of the carriage in particular. Said strips can in fact be readily followed by magnetic detectors (not shown) which are transported by the carriage 13. The information provided by these detectors permits differential control of the caterpillar tracks and the desired displacement with transfer from one weld seam to another along paths shown diagrammatically in FIG. 1.

The carriage 13 can be periodically stopped along each of the weld seams 12 so that the testing and measuring devices supported by said carriage and especially the ultrasonic testing apparatus can be placed in position for continuous inspection of the weld seams. At the same time, the deformable parallelogram system 30 (shown in FIG. 2) which is actuated by the jack 36–37 controls the constant pressure of application against the primary vessel wall while permitting rapid disengagement of said system in the event of any obstruction which may be encountered during the displacement. The camera 39 is also switched on at the same time and a suitable angular displacement permits visual scanning of the corresponding zone of the vessel wall, especially in front of the carriage. The visual control carried out by the camera is advantageously performed by means of an electronic viewfinder with voltage regulation, the complete assembly being capable of withstanding temperatures which are suitably regulated within the interior of the camera casing by means of a ventilating fan (not shown in the drawings). A remote-controlled focusing system is also associated with the camera as well as a series of variable-intensity iodine spotlights mounted on the carriage. Finally, sets of mirrors permit axial sighting as well as lateral sightings. Similarly, the ultrasonic testing apparatus 41 is preferably controlled by a mechanism (not shown) which serves to produce a relative displacement of the measuring head in the immediate vicinity of the wall of the primary vessel 1 so as to sweep each of the weld seams 12 at right angles to their direction progressively as the carriage advances.

In the example described, nine elements are chosen for each caterpillar track which is in contact with the containment vessel wall and each element carries two magnets. Thus a total of 36 magnets are put in action simultaneously. This number is sufficiently high to ensure that accidental detachment of a few elements as a result of surface defects, for example, is not liable to affect the stability of the entire system. It is readily apparent that other alternative forms of construction could be contemplated. Accordingly, instead of making use of permanent magnets as in the example described in the foregoing, it would be possible to employ electromagnets or even pneumatic suction cups or the like, all these means being adapted to ensure suitable application of the carriage 13 against the wall of the containment vessel 2 without any attended danger of direct contact with the wall of the primary vessel 1. A noteworthy result achieved in all cases is that the carriage 13 can be detached in any position within the interspace 3 by means of its jacks or spring components 46 as a result of reaction of the operating rods 47 against the containment vessel 2 and that said carriage can be withdrawn to the exterior of said interspace under emergency conditions by the application of a tractive effort on the suspension cable 14 by means of the winding winch 15.

As has been clearly brought out by the foregoing description, the invention is not limited in any sense to the example of construction herein described and illustrated but extends on the contrary to all alternative forms.

What we claim is:

1. A device for remote testing of a structure, comprising a primary vessel surrounded externally by a containment vessel, wherein said device comprises a self-propelled carriage, means for inspecting the primary vessel on said carriage, said carriage moving within the interspace between the primary vessel and the containment vessel to inspect and test any predetermined zone of the primary vessel, a drive mechanism for said carriage co-operating with the oppositely-facing wall of the containment vessel and applied against said wall, a composite cable suspending said carriage and supplying said carriage with power and with different fluids required for positioning and operation of said inspection means, said cable serving to introduce the carriage into the interspace and to withdraw it therefrom, a handling apparatus for actuating said composite cable, said self-propelled carriage comprising a supporting chassis, two parallel driving caterpillar tracks on said chassis, two sprocket-wheels on said chassis guiding and driving said chassis at an adjustable speed, said sprocket-wheels being located respectively at the front and at the rear with respect to the direction of displacement of said carriage, a motor driving each sprocket-wheel in rotation independently of the other sprocket-wheel about an axis located transversely with respect to said chassis, each of said caterpillar tracks including a plurality of identical articulated elements in juxtaposed relation, lateral rollers for said elements engageable with said sprocket-wheels, and means carried by each of said elements for temporary attachment to the surface of the containment vessel for maintaining said carriage applied against said containment vessel without limiting its relatively displacement in front of the primary vessel.

2. A testing device according to claim 1, wherein the containment vessel is constructed of magnetic material, wherein each caterpillar-track element comprises a frame having a cavity in which is movably mounted a plunger-piston for attachment to the surface of the containment vessel in a direction at right angles to the axis of rotation of the sprocket-wheels, said piston being fitted with a terminal permanent magnet which is applied against the surface of the containment vessel.

3. A testing device according to claim 2, wherein the plunger piston is slidably mounted within a bore of the frame a head-piece for said piston forming a stop, a spring applied against said head-piece and against an annular seating on the frame, said spring applying on the piston a force which is combined with the force of attraction of the magnet by the containment vessel wall with release of the magnet driven by the rear sprocket-wheel during the winding-on displacement of the caterpillar track.

4. A testing device according to claim 2, wherein the plunger piston has an axial blind-end bore, a stud slidably mounted in said bore a plurality of resilient washers in said bore applied against the bottom of said bore and opposing movement of said stud, said stud cooperating with a cylindrical guide boss coaxial with the axis of said front sprocket-wheel, said cylindrical guide boss forming a cam for exerting on said stud a force compressing said washers and the initial displacement of the plunger piston whereby the magnet carried by said piston projects from the element facilitating the attraction of the piston by the containment vessel wall.

5. A testing device according to claim 2, including means for guidiing the self-propelled carriage including a series of magnetic strips projected onto a non-magnetic wall of the primary vessel in a direction parallel to weld seams and a magnetic detector providing a signal, a signal delivered by said detector acting on the motors driving the caterpillar tracks of the carriage and controlling the displacement of said carriage.

6. A testing device according to claim 1, wherein the chassis of the self-propelled carriage comprises a double deformable parallelogram provided on each side of the axis of displacement of the carriage with two parallel link-arms pivoted at one end about two pins carried by the chassis, said two link-arms being in turn pivoted at their opposite ends on a supporting member, an orientable camera mounted on said supporting member and ultrasonic testing means applied against an external wall of the primary vessel.

7. A testing device according to claim 6, wherein opening movement of the deformable parallelogram is carried out by pneumatic jacks pivotally mounted on the chassis and on the articulation link-arms.

8. A testing device according to claim 1, the chassis of the self-propelled carriage including safety jacks, bodies for said jacks at right angles to the containment vessel wall, operating rods for said jacks for detachment of the carriage within the interspace by engagement on said wall for withdrawal of said carriage by said composite suspension cable.

9. A testing device according to claim 1, wherein the means for temporary locking of the carriage on the containment vessel are constituted by electromagnets or by pneumatic suction cups.

* * * * *